(12) United States Patent
Helvey et al.

(10) Patent No.: US 7,780,061 B2
(45) Date of Patent: Aug. 24, 2010

(54) JOINING FIXTURES, METHODS FOR JOINING, AND JOINED STRUCTURES

(75) Inventors: Amy Helvey, Imperial, MO (US); V. Blake Slaughter, Manchester, MO (US)

(73) Assignee: The Boeing Company, Chicago, IL (US)

( * ) Notice: Subject to any disclaimer, the term of this patent is extended or adjusted under 35 U.S.C. 154(b) by 268 days.

(21) Appl. No.: 11/862,833

(22) Filed: Sep. 27, 2007

(65) Prior Publication Data

US 2009/0084769 A1   Apr. 2, 2009

(51) Int. Cl.
*B23K 20/12*   (2006.01)
(52) U.S. Cl. ................ 228/112.1; 228/2.1; 228/2.3; 269/53; 219/136
(58) Field of Classification Search ........... 228/112.1, 228/2.1, 2.3; 428/615; 156/73.5, 580; 269/53; 219/136
See application file for complete search history.

(56) References Cited

U.S. PATENT DOCUMENTS

| | | | |
|---|---|---|---|
| 5,560,151 A | | 10/1996 | Roberts |
| 5,716,693 A | | 2/1998 | Pittman |
| 6,050,474 A | * | 4/2000 | Aota et al. ............... 228/112.1 |
| 6,314,702 B1 | * | 11/2001 | Huang ....................... 52/656.1 |
| 6,315,187 B1 | * | 11/2001 | Satou et al. .............. 228/112.1 |
| 6,321,975 B1 | * | 11/2001 | Kawasaki et al. ........ 228/112.1 |
| 7,048,174 B2 | * | 5/2006 | Buchheit et al. ........... 228/44.3 |
| 7,347,350 B2 | * | 3/2008 | Blankenship et al. ...... 228/49.1 |
| 2001/0052561 A1 | * | 12/2001 | Wollaston et al. ........... 244/132 |
| 2003/0189033 A1 | | 10/2003 | Aoyama et al. |

FOREIGN PATENT DOCUMENTS

| | | |
|---|---|---|
| BE | 630 464 | 4/1963 |
| JP | 2596060 | 4/1997 |
| JP | 10-35487 | 2/1998 |

OTHER PUBLICATIONS

P. Wanijara et al; Linear Friction Welding of Ti-6AI-4V: Processing, Microstructure, and Mechanical-Property Inter-Relationships; Metallurgical and Materials Transactions A; vol. 36A, pp. 2149-2164; Aug. 2005.
Phillips Plastics Corporation; "Metal Injection Molding Design Guide"; © 2006.
P. Divya et al.; Injection Moulding of Titanium Metal and AW-PMMA Composite Powders; Trends Biometer. Artif. Organs, vol. 18 (2), pp. 247-253; Jan. 2005.
International Search Report dated Jan. 16, 2009 for International Application No. PCT/US2008/076118, 15 pages.
Database WPI Week 199718, 1997-195696, XP002508230, 1 page, 1997.

* cited by examiner

*Primary Examiner*—Roy King
*Assistant Examiner*—Michael Aboagye
(74) *Attorney, Agent, or Firm*—Klintworth & Rozenblat IP LLC

(57) ABSTRACT

In one embodiment, a holding fixture is disclosed for locating and stabilizing substantially identical repeated units during joining of the repeated units. In another embodiment, a method is disclosed for manufacturing a structure comprising substantially identical repeated units. In still another embodiment, a welded structure is provided comprising a plurality of welded together substantially identical repeated units.

13 Claims, 10 Drawing Sheets

JOINING FIXTURES, METHODS FOR JOINING, AND JOINED STRUCTURES

BACKGROUND

Many of the existing apparatus and/or methods for forming structures utilize machines which cut plates in a predetermined manner in order to remove scrap material from the plates to produce the structure desired. This may require procuring additional plate material, complex machinery in order to insure minimal gage, costly and timely manufacturing processes, increased weight and size, an excess of material, and/or other types of problems.

An apparatus and/or method is needed to decrease one or more problems associated with one or more of the existing methods for forming structures.

SUMMARY

In one aspect of the disclosure, a holding fixture is disclosed for locating and stabilizing substantially identical repeated units during welding of the repeated units. The holding fixture comprises a plate member configured such that at least one dimension of the plate member is substantially similar to at least one dimension of each repeated unit. The plate member comprises at least one of a male member and a female cavity for attaching the plate member to each repeated unit.

In another aspect of the disclosure, a method is disclosed for manufacturing a structure comprising substantially identical repeated units. In one step, a first repeated unit is placed against a holding fixture. In another step, the holding fixture is secured to the first repeated unit. In still another step, the first repeated unit is welded to an adjacent repeated unit. In an additional step, the holding fixture is removed.

In still another aspect of the disclosure, a welded structure is provided comprising a plurality of welded together substantially identical repeated units. Each repeated unit was welded utilizing a same holding fixture which located and stabilized each repeated unit in place.

These and other features, aspects and advantages of the disclosure will become better understood with reference to the following drawings, description and claims.

DETAILED DESCRIPTION

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Figure 1:
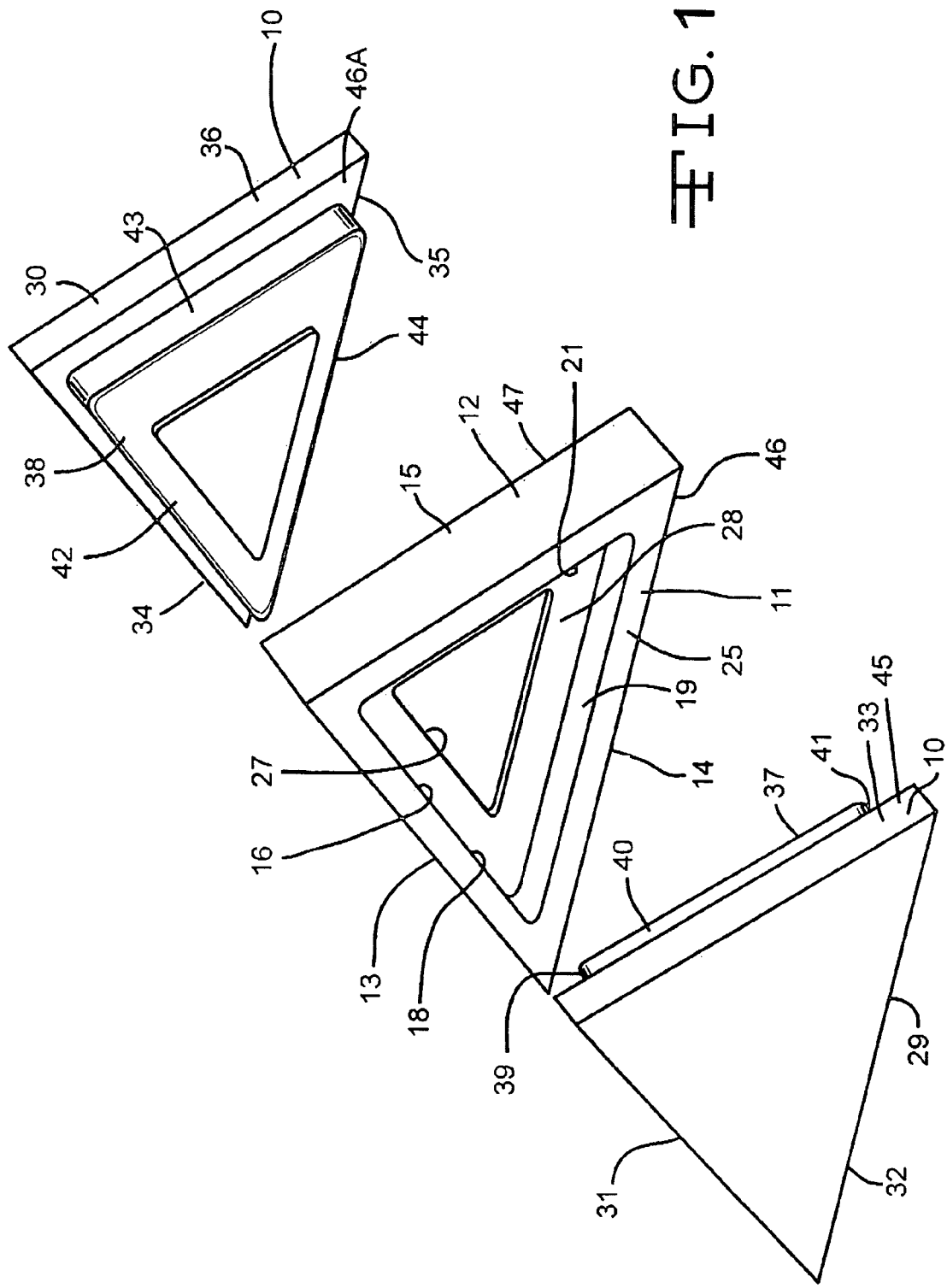
FIG. 1 shows a perspective view of one side of one embodiment of a holding fixture disposed apart from a repeated unit.

FIG. 1 shows a perspective view of one side of one embodiment of a holding fixture 10 disposed apart from a repeated unit 11. The repeated unit 11 may comprise a part of an aircraft such as a stiffener for a wall or fuselage of an aircraft. As will be disclosed more thoroughly below, the holding fixture 10 may be used to locate and stabilize substantially identical repeated units 11 during joining of the repeated units 11 together, such as during a welding process. The holding fixture 10 may be used during solid state welding, linear friction welding, or other type of joining processes used to join repeated units 11 together. It should be noted that while only one repeated unit 11 is shown in FIG. 1, a plurality of repeated units 11 are shown and discussed in subsequent Figures.

Figure 2:
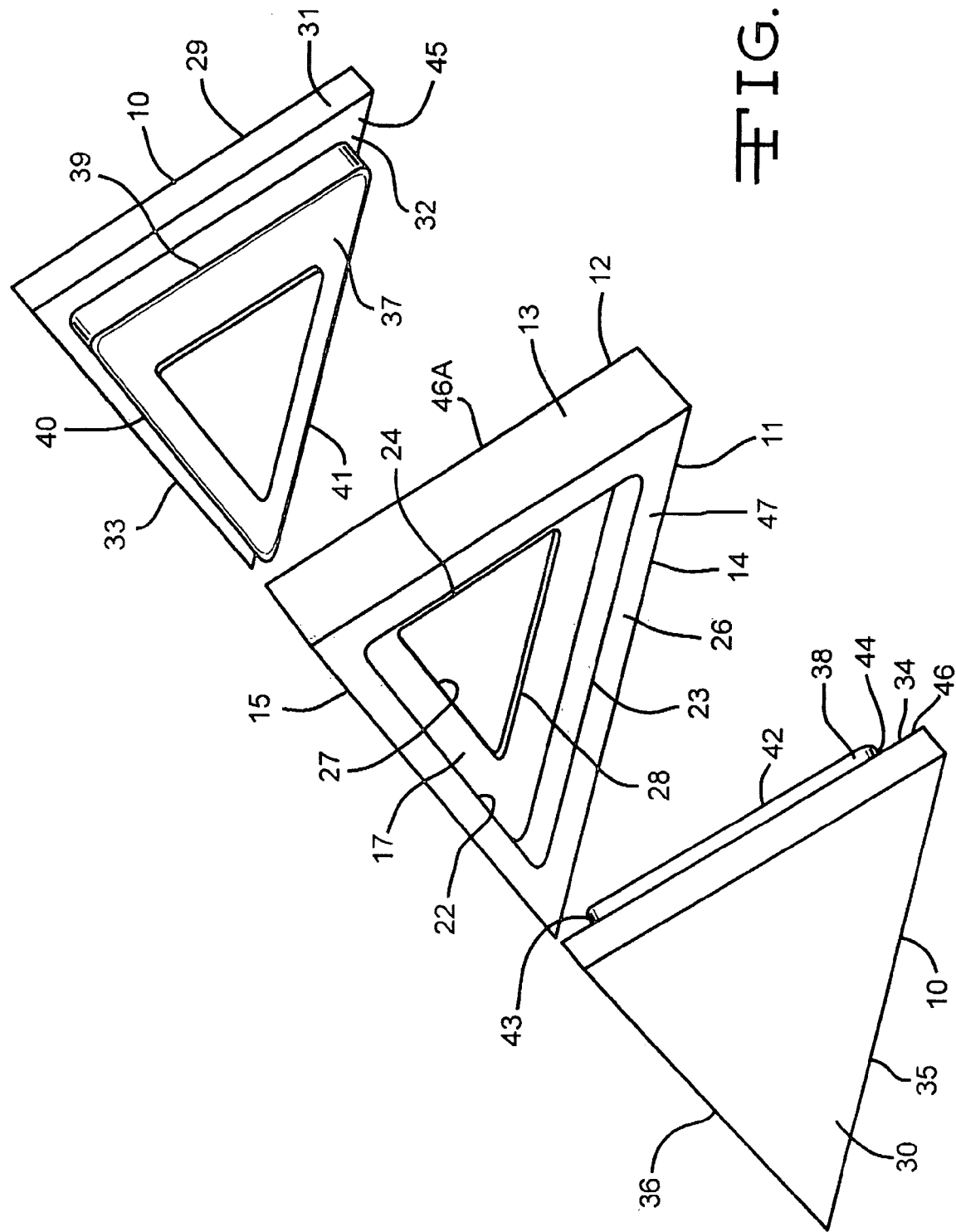
FIG. 2 shows a perspective view of the opposite side of the embodiment of FIG. 1 with the holding fixture disposed apart from the repeated unit.

The repeated unit 11 may comprise an isometric grid unit 12 in the shape of a triangle with outer sides 13, 14, and 15. FIG. 2 shows a perspective view of the opposite side of the embodiment of FIG. 1 with the holding fixture 10 disposed apart from the repeated unit 11. As shown in FIGS. 1 and 2, identical, triangular-shaped female cavities 16 and 17 having respective sides 18, 19, and 21, and 22, 23, and 24 may be defined on opposing sides 25 and 26 of the repeated unit 11. A triangular opening 27 may be defined in a center interior surface 28 of the repeated unit 11. The repeated unit 11 may be made of any material that may be linear friction welded. In other embodiments, the repeated unit 11 may comprise varying shapes, sizes, materials, orientations, and configurations.

The holding fixture 10 may comprise two identical, triangular-shaped plate members 29 and 30 having respective outer sides 31, 32, 33 and 34, 35, and 36. In other embodiments, any number of plate members may be utilized having varying shapes, sizes, configurations, and orientations. The dimensions of the respective outer sides 31, 32, 33 and 34, 35, and 36 of the plate members 29 and 30 may be substantially similar to the dimensions of the outer sides 13, 14, and 15 of each repeated unit 11. In other embodiments, varying dimensions of the plate members 29 and 30 may be substantially similar to varying dimensions of each repeated unit 11.

The plate members 29 and 30 may include respective male members 37 and 38 protruding from the respective plate members 29 and 30. The male members 37 and 38 may be triangular-shaped having respective sides 39, 40, and 41, and 42, 43, and 44. The male members 37 and 38 may be inserted and interlocked within the respective triangular-shaped female cavities 16 and 17 formed in the opposing sides of each repeated unit 11. After insertion, sides 39, 41, and 40 of male member 37 of plate member 29 may abut against sides 18, 19, and 21 of female cavity 16 of repeated unit 11. Similarly, after insertion, sides 42, 43, and 44 of male member 38 of plate member 30 may abut against sides 24, 22, and 23 of female cavity 17 of repeated unit 11. At this point in time, surface 45 of plate member 29 may abut against surface 46A of repeated unit 11. Similarly, surface 46 of plate member 30 may abut against surface 47 of repeated unit 11.

Figure 3:
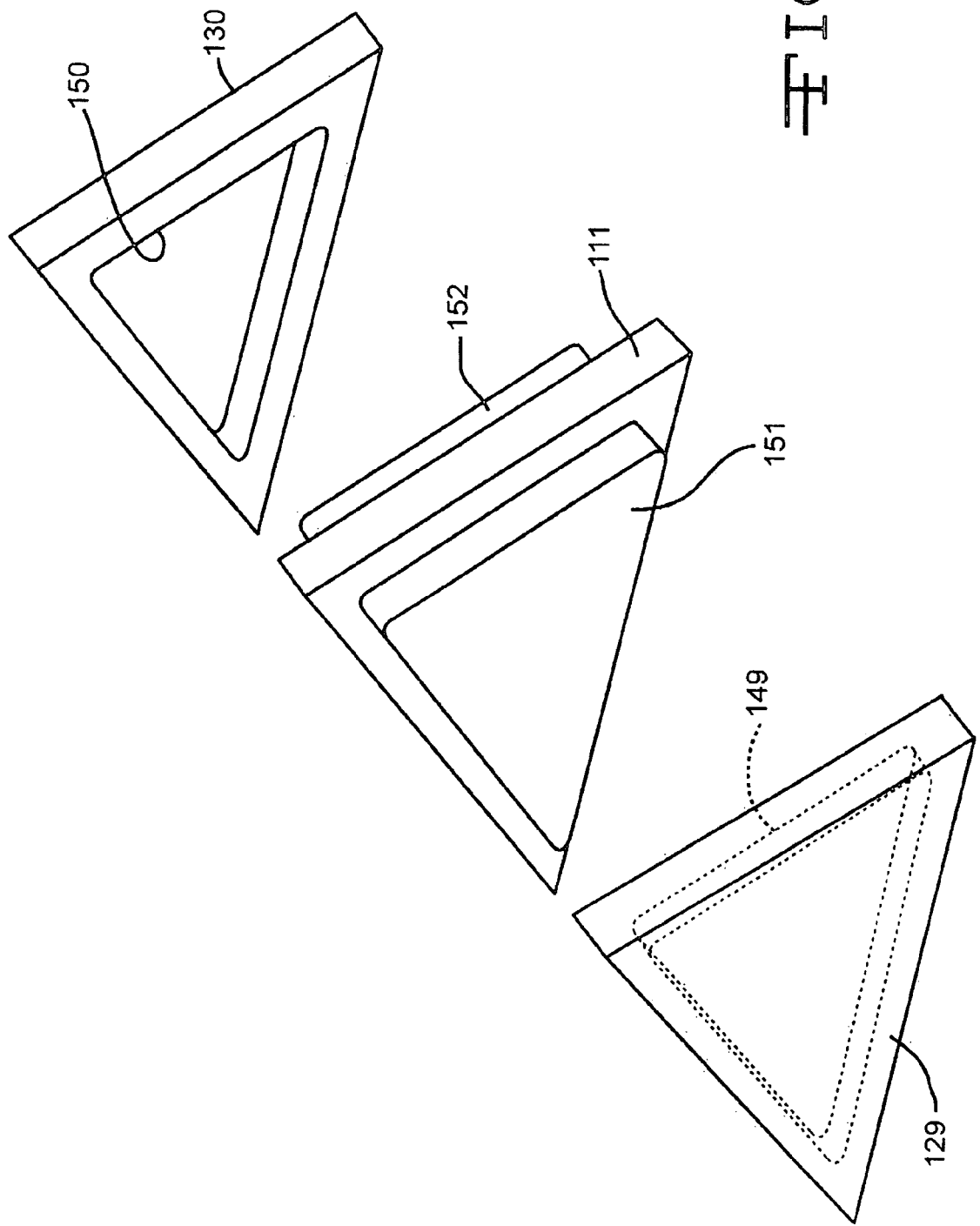
FIG. 3 shows a perspective view another embodiment of a holding fixture disposed apart from a repeated unit.

In further embodiments, as shown in the perspective view of FIG. 3, the plate members 129 and 130 may include female cavities 149 and 150 for attaching and interlocking the plate members 129 and 130 to male members 151 and 152 of each repeated unit 111. The female cavities 149 and 150 and the male members 151 and 152 may be in varying shapes, sizes, orientations, and configurations.

Figure 4:
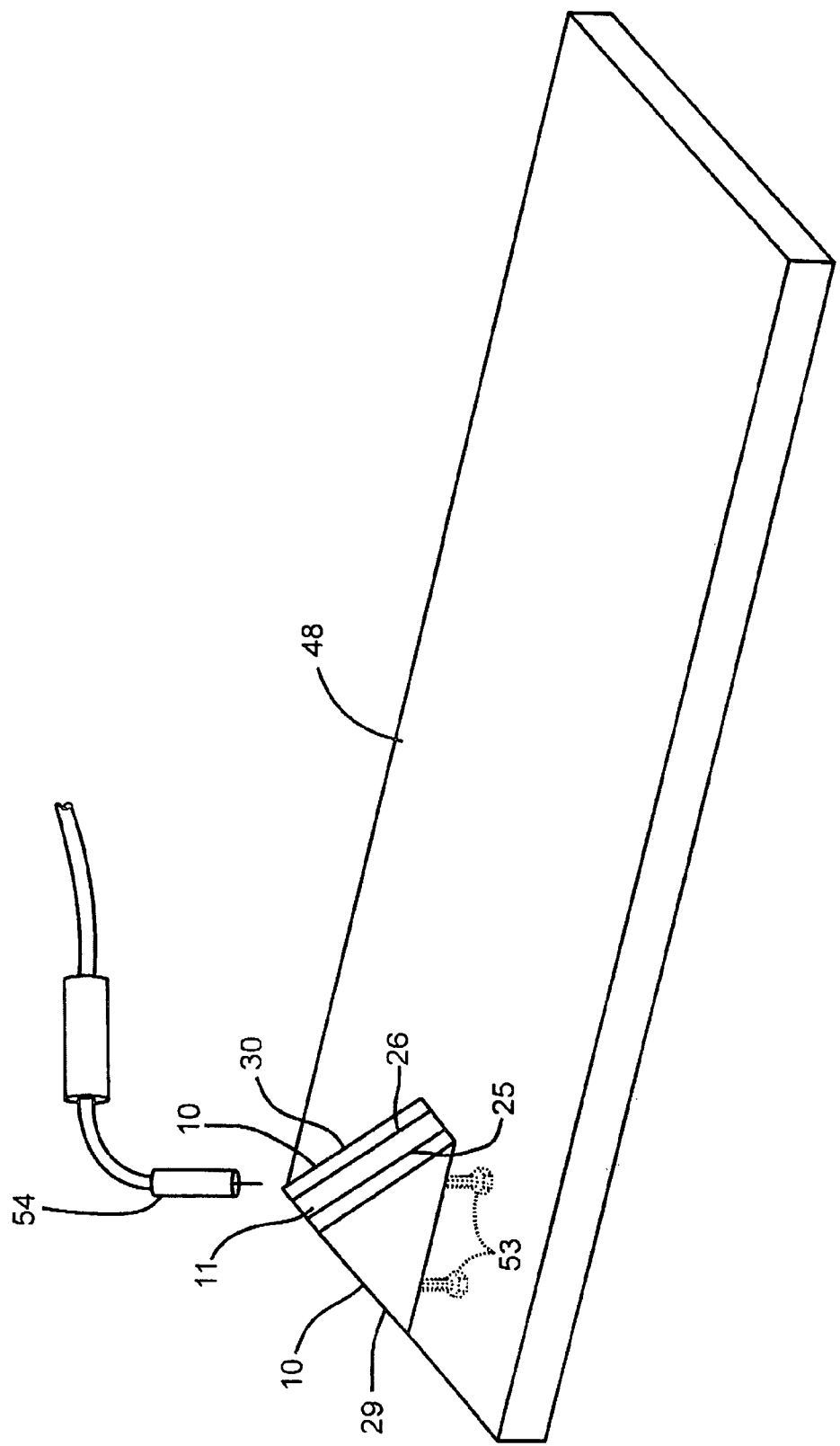
FIG. 4 shows a perspective view of the holding fixture of the embodiment of FIG. 1 after the holding fixture has been attached to the repeated unit, and both the holding fixture and the attached repeated unit have been disposed against a base member.

FIG. 4 shows a perspective view of the holding fixture 10 of the embodiment of FIG. 1 after the holding fixture 10 has been attached to the repeated unit 11, and both the holding fixture 10 and the attached repeated unit 11 have been disposed against a base member 48. The holding fixture 10 may have been attached to the repeated unit 11 due to the interlocking of the male members 37 and 38 of the plate members 29 and 30 within the triangular-shaped female cavities 16 and 17 of the repeated unit 11. In such manner, the respective male members 37 and 38 may have been used for attaching and securing the plate members 29 and 30 to the respective triangular-shaped female cavities 16 and 17 formed in opposing sides 25 and 26 of each repeated unit 11. In other embodiments, the male members 37 and 38 and the female cavities 16 and 17 may be in varying shapes, sizes, configurations, and orientations. In still other embodiments, varying attachment mechanisms may be utilized to attach the plate members 29 and 30 to each repeated unit 11.

The plate members 29 and 30 of FIG. 4 may be attached, through bolts 53 or other mechanisms, to the base member 48 in order to securely lock the repeated unit 11 between the plate members 29 and 30 in a predetermined located and stabilized position relative to the base member 48 and the plate members 29 and 30. A joining device 54, such as a welding device, may be used to join the repeated unit 11 in place with the base member 48. The joining device 54 may comprise a solid state welding device, a linear friction welding device, or other type of joining device. In such manner, the repeated unit 11 may be securely joined to base member 48 in a predetermined position. The plate members 29 and 30 of the holding fixture 10 may then be released from the repeated unit 11 by removing the bolts 53 or other joining mechanisms to leave the repeated unit 11 joined in place relative to the base member 48 without the support of the holding fixture 10.

Figure 5:
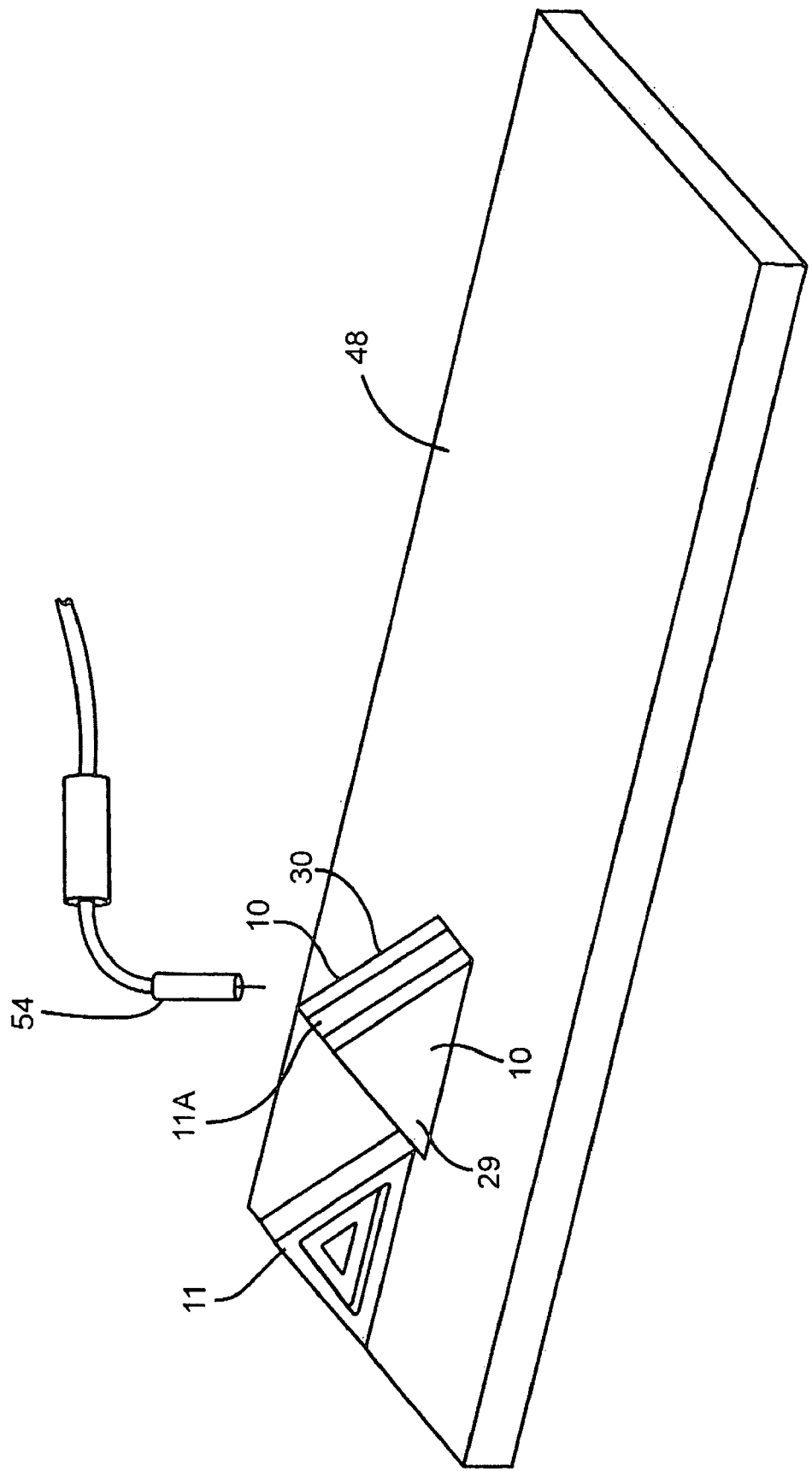
FIG. 5 shows a perspective view of the embodiment of FIG. 4 with the holding fixture removed from the first repeated unit, which is still in a secured position against the base member, and the holding fixture secured to both a second repeated unit and to the base member.

FIG. 5 shows a perspective view of the embodiment of FIG. 4 with the holding fixture 10 removed from the first repeated unit 11, which is still in a secured position against the base member 48, and the holding fixture 10 secured to both a second repeated unit 11A and to the base member 48. In the position shown in FIG. 5, the second repeated unit 11A is aligned parallel to the first repeated unit 11, however in other embodiments the second repeated unit 11A may be aligned in varying orientations and configurations. In such manner, the second repeated unit 11A may be held in a predetermined, stabile location relative to the base member, 48, the holding fixture 10, and to the first repeated unit 11. The second repeated unit 11A may be identical to the first repeated unit 11. Similarly, the holding fixture 10 may be identically secured to the second repeated unit 51A as it was secured to the first repeated unit 11. Likewise, the holding fixture 10 may be identically secured to the base member 48 as previously discussed.

The joining device 54, which may be a welding device, may again be used to securely join the second repeated unit 11A in place with the base member 48 in a predetermined position. The plate members 29 and 30 of the holding fixture 10 may then be released from the second repeated unit 11A as previously discussed to leave the second repeated unit 11A in place relative to the base member 48, and first repeated unit 11 without support of the holding fixture 10.

Figure 6:
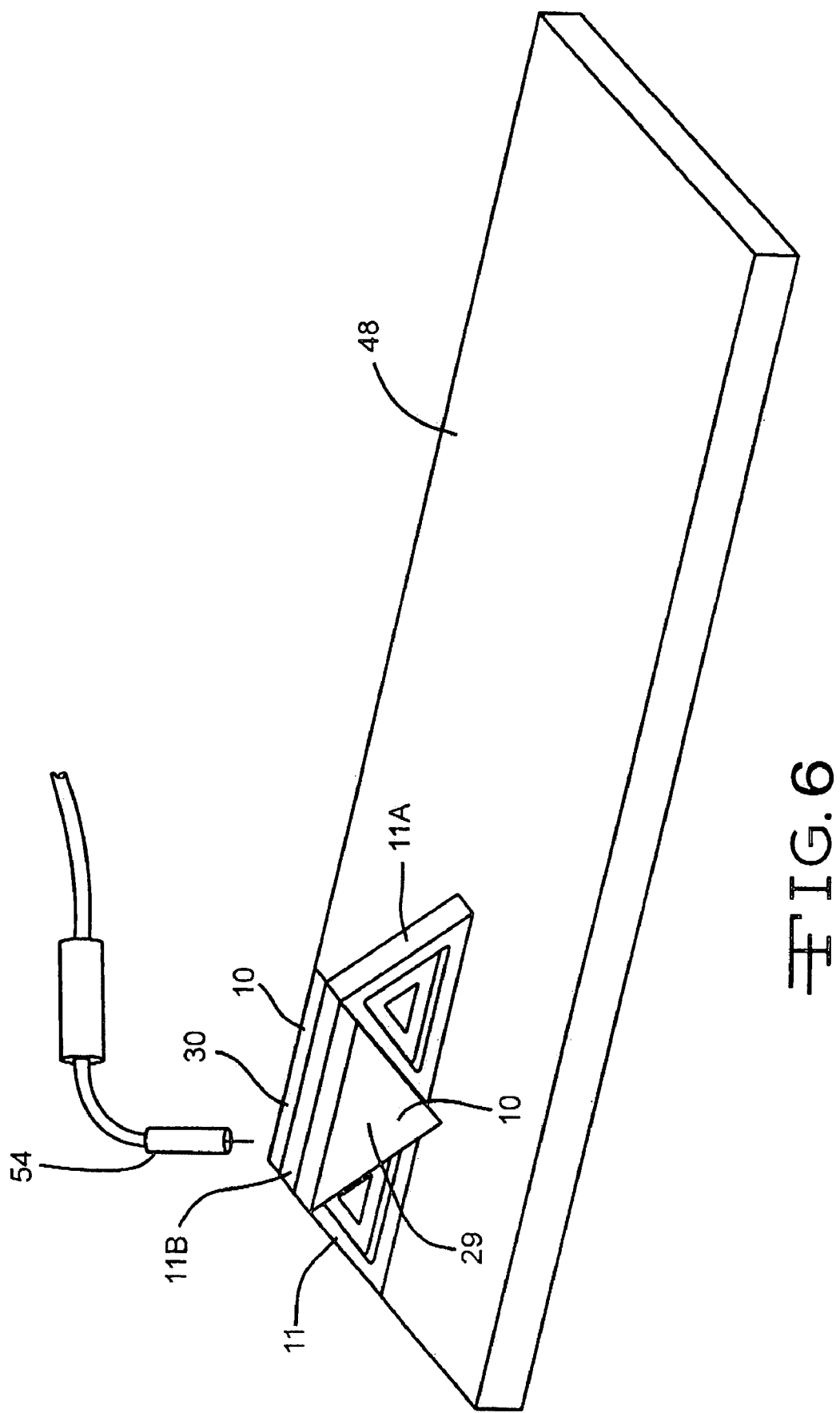
FIG. 6 shows a perspective view of the embodiment of FIG. 5 with the holding fixture removed from the second repeated unit, which is still in a secured position against the base member, and the holding fixture secured to both a third repeated unit and to the base member.

FIG. 6 shows a perspective view of the embodiment of FIG. 5 with the holding fixture 10 removed from the second repeated unit 11A, which is still in a secured position against the base member 48, and the holding fixture 10 secured to both a third repeated unit 11B and to the base member 48. In the position shown in FIG. 6, the third repeated unit 11B is disposed upside down between the first and second repeated units 11 and 11A. In other embodiments, the third repeated unit 11B may be disposed in varying orientations and configurations. In such manner, the third repeated unit 11B may be held in a predetermined, stabile location relative to the base member 48, the holding fixture 10, and to the first and second repeated units 11 and 11A. The third repeated unit 11B may be identical to the first and second repeated units 11 and 11A. Similarly, the holding fixture 10 may be identically secured to the third repeated unit 11B as it was secured to the first and second repeated units 11 and 11A. Likewise, the holding fixture 10 may be identically secured to the base member 48 as previously discussed.

The joining device 54, which may be a welding device, may be used to securely join the third repeated unit 11B in place between and to the first and second repeated members 11 and 11A on top of the base member 48 in a predetermined position. The plate members 29 and 30 of the holding fixture 10 may then be released from the third repeated unit 11B as previously discussed to leave the third repeated unit 11B in place between the first and second repeated units 11 and 11A and above the base member 48 without support of the holding fixture 10. In such manner, the first, second, and third repeated units 11, 11A, and 11B may be securely joined to one another and the base member 48.

Figure 7:
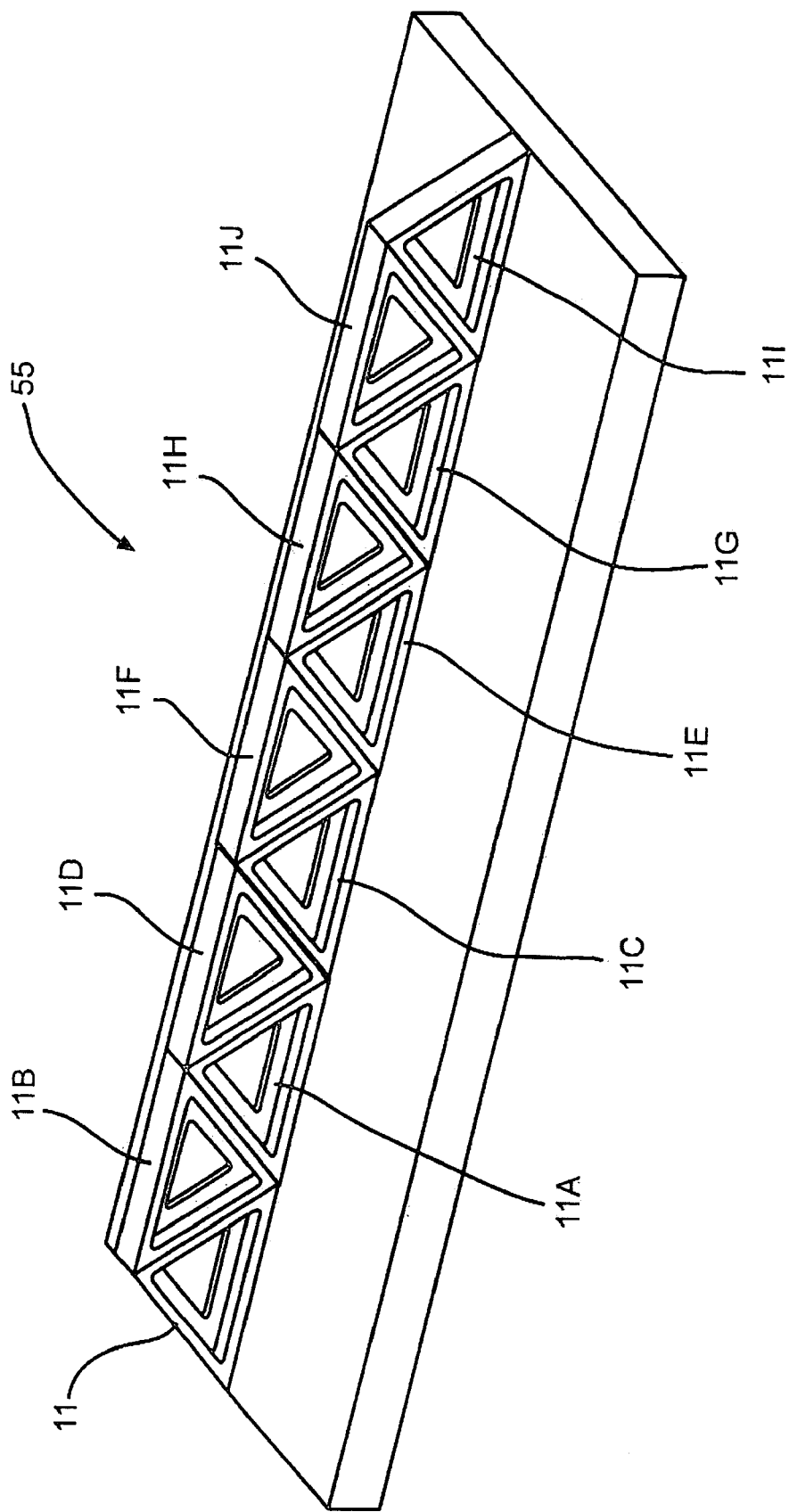
FIG. 7 shows a perspective view of one embodiment of a repeated unit structure formed utilizing the disclosure.

The manufacturing steps detailed in the discussion of FIGS. 4-6 may be repeated to join additional repeated units 11C-11J to base member 48 and repeated units 11, 11A, and 11B in order to form the structure 55 shown in FIG. 7. Repeated units 11-11J may have been formed, cast, extruded, or manufactured using another type of manufacturing process. The structure 55 may subsequently be used in an aircraft. During this process, the additional repeated units 11C-11J may again be alternately joined as previously discussed. In such manner, a welded structure 55 may be formed comprising a plurality of welded together substantially identical repeated units 11-11J, which may each comprise isometric grid units. Each of the repeated units may have been welded in place utilizing a same holding fixture 10 which located and stabilized each repeated unit 11-11J in place.

Figure 8:
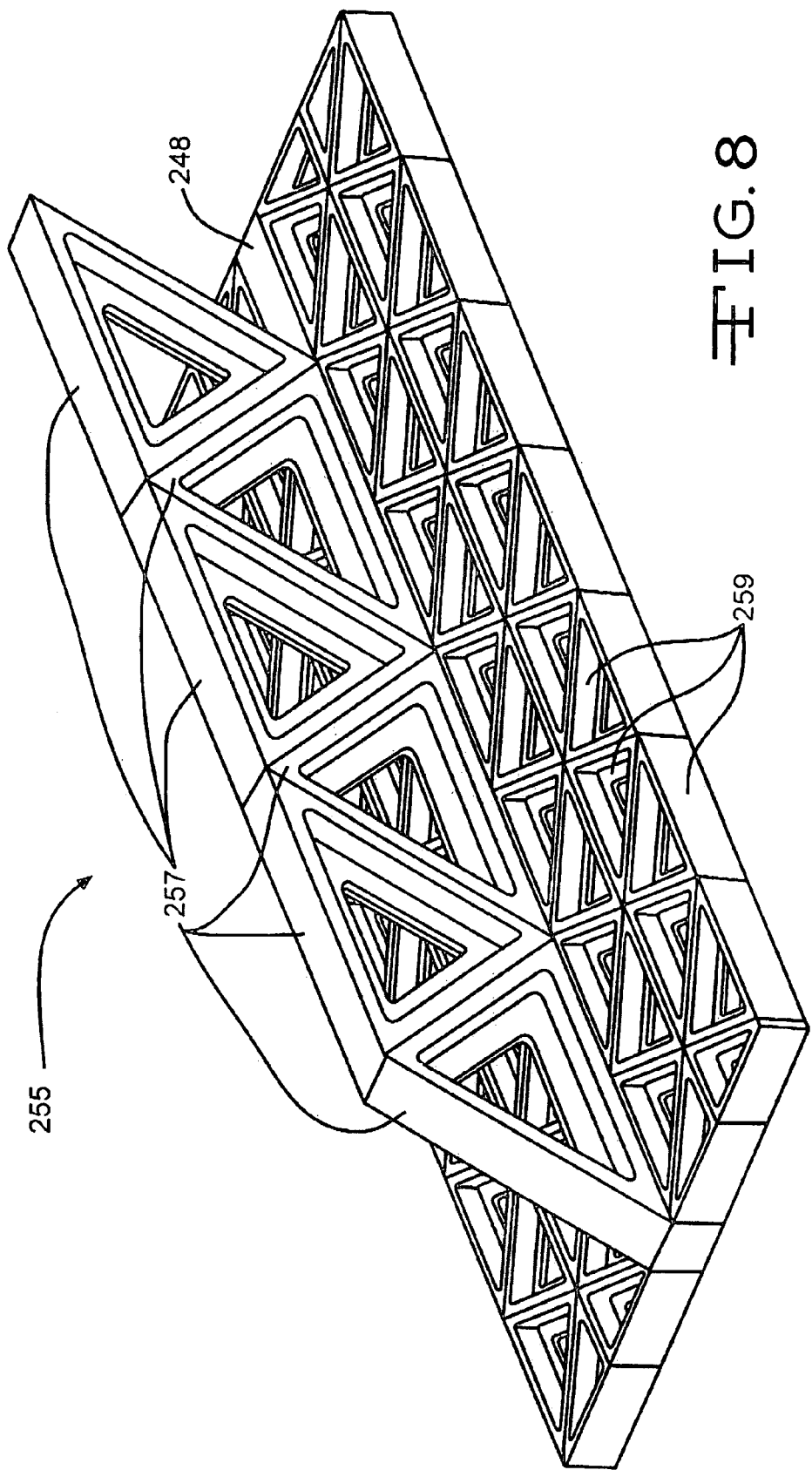
FIG. 8 shows a perspective view of another embodiment of a repeated structure formed utilizing the disclosure.
Figure 9:
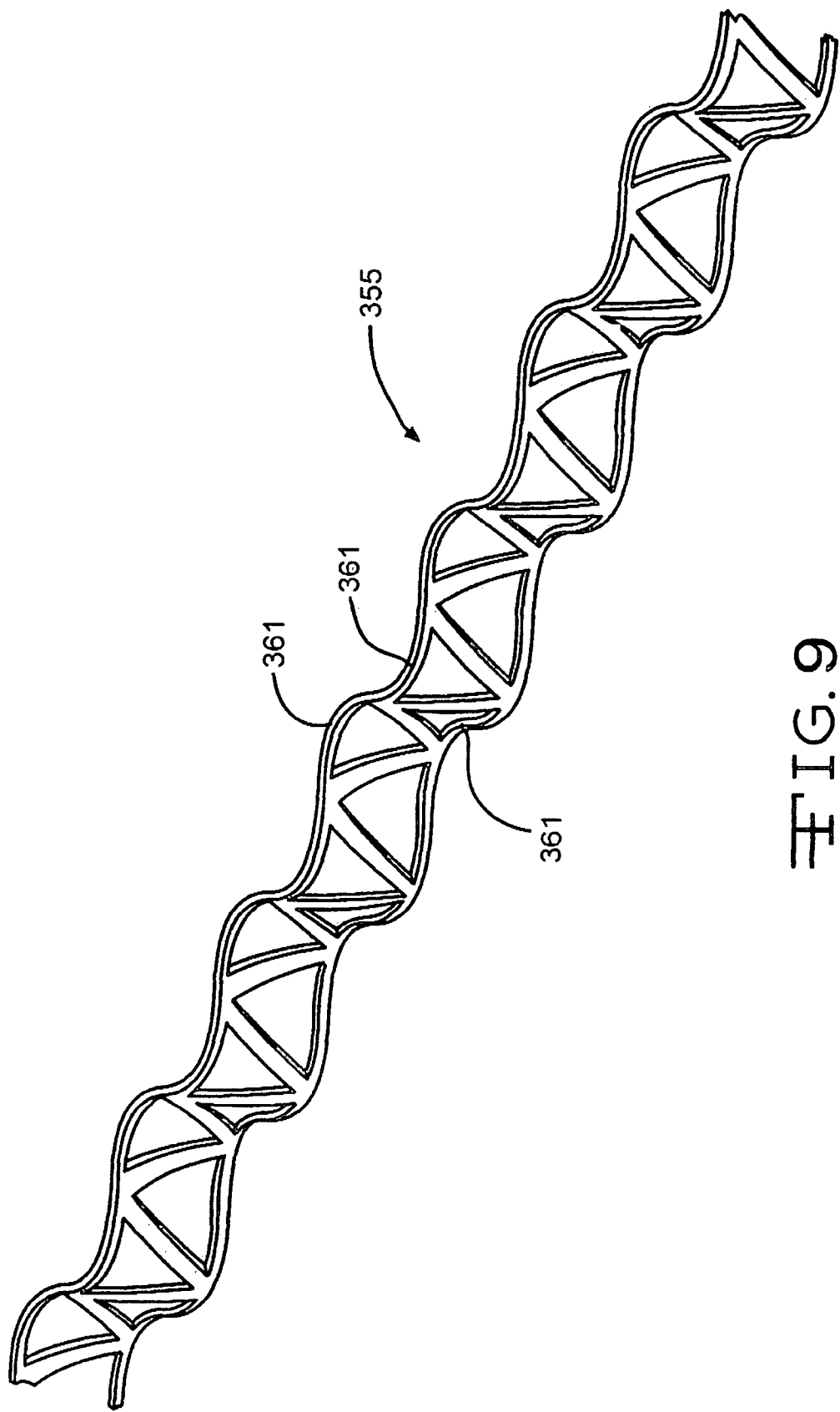
FIG. 9 shows a perspective view of still another embodiment of a repeated unit structure formed utilizing the disclosure.

In other embodiments, varying structures having varying orientations, sizes, configurations, and shapes may be formed using varying orientations, sizes, configurations, and shapes of repeated units utilizing the steps of this disclosure. For instance. FIG. 8 shows a perspective view of at least two different types of repeated units 257 and 259, having been joined together utilizing the disclosure in a varying angled configuration relative to each other and to a varying base member 248 in order to form an angled structure 255. In still other embodiments, varying angled, shaped, sized, oriented, and configured structures may be formed. For instance, FIG. 9 shows a perspective view of a plurality of repeated units 361, having curved configurations, having been joined together utilizing the disclosure to form a curved, angled structure 355.

Figure 10:
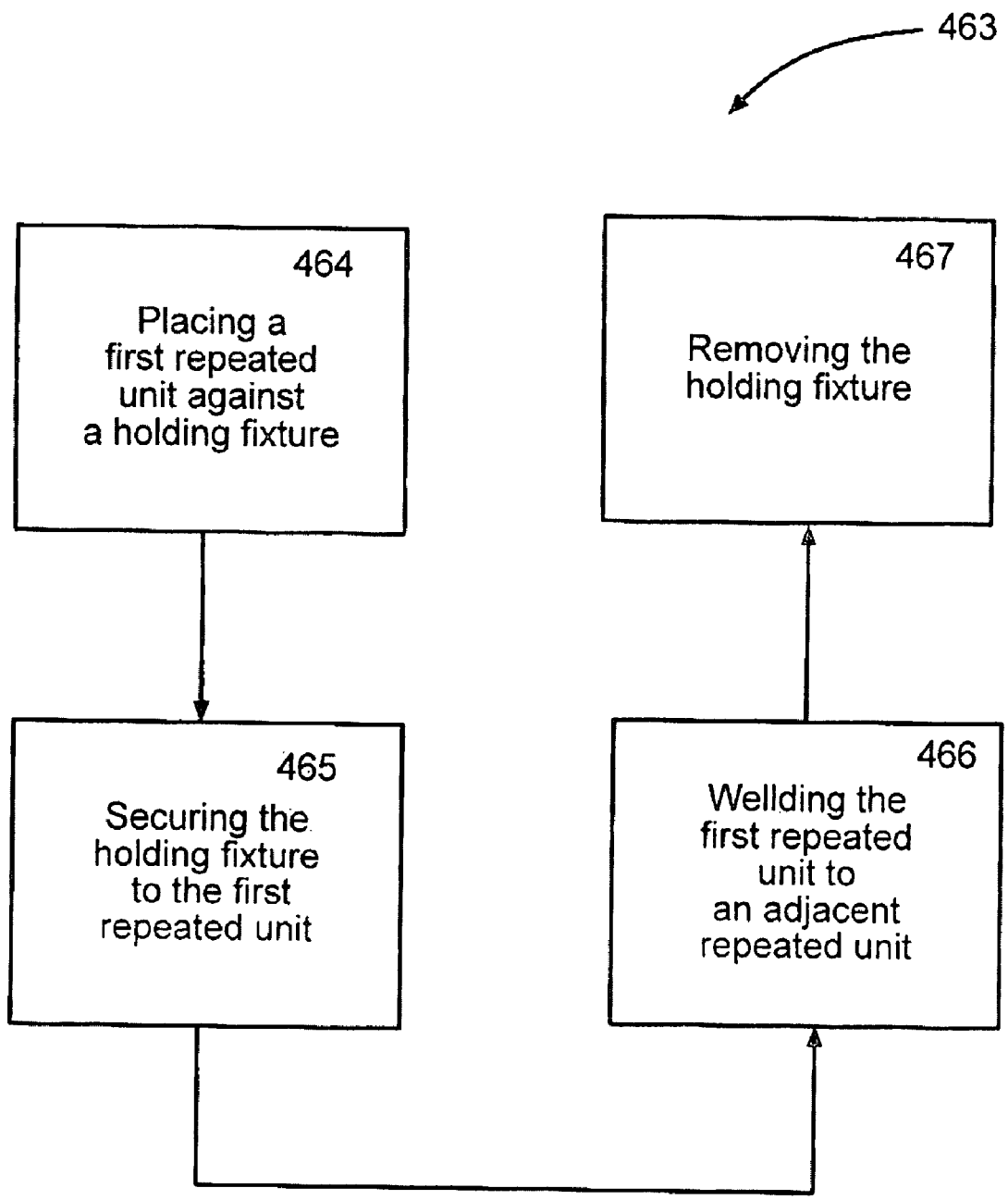
FIG. 10 shows a flowchart of one embodiment of a method for manufacturing a structure comprising substantially identical repeated units.

FIG. 10 shows a flowchart of one embodiment of a method 463 for manufacturing a structure 55 comprising substantially identical repeated units 11 and 11B. The manufactured structure 55 may be used in an aircraft. The repeated units 11 and 11B may comprise Isometric grid units which are formed, cast, or extruded. In one step 464, a first repeated unit 11 may be placed against a holding fixture 10. The holding fixture 10 may comprise a plate member 29 configured such that at least one dimension of the plate member 29 is substantially similar to at least one dimension of each repeated unit 11 and 11B. The plate member 29 may comprise at least one of a male member 37 and a female cavity 16 for securing the plate member 29 to each repeated unit 11 and 11B. In another embodiment, the holding fixture 10 may comprise two plate members 20 and 30 which are placed on opposite sides 25 and 26 of the first repeated unit 11.

In another step 465, the holding fixture 10 may be secured to the first repeated unit 11. Step 465 may comprise locking a male member 37 of the holding fixture 10 to a female cavity 16 of the first repeated unit 11. In another embodiment, step 465 may comprise locking a female cavity 149 of the holding fixture 110 to a male member 151 of the first repeated unit 111. In yet another step 466, the first repeated unit 11 may be welded to an adjacent repeated unit 11B. The welding step 466 may comprise at least one of solid state welding and linear friction welding, in an additional step 467, the holding fixture 10 may be removed. In additional embodiments, the holding fixture 10 may be locked in place over additional repeated units one at a time, the additional repeated units may be joined to the previously joined repeated units utilizing welding or another joining mechanism, and the holding fixture 10 may then be removed and subsequently placed over still other repeated units and the process repeated in order to form a structure having a varying number of joined, repeated units. In other embodiments, at least two different types of repeated units 257 and 259 may be joined.

One or more embodiments of the disclosure may reduce and/or eliminate one or more problems of one or more of the existing apparatus and/or methods for forming structures. For instance, one or more embodiments of the disclosure may reduce cost, may reduce material scrap, may reduce manufacturing time, may reduce size, may reduce weight, may be more efficient, may reduce the complexity of manufacturing, may allow for the manufacture of more varied structures, may improve strength, may improve durability, and/or may reduce one or more other problems of one or more of the existing apparatus and/or methods for forming structures.

It should be understood, of course, that the foregoing relates to exemplary embodiments of the disclosure and that modifications may be made without departing from the spirit and scope of the disclosure as set forth in the following claims.

The invention claimed is:

1. A method for manufacturing a structure comprising repeated units, the method comprising:

securing a holding fixture, comprising two plate members, to opposed sides of a repeated unit by mating at least one of a male member or a female cavity of each of the plate members to at least one of a mating female cavity or a mating male member of each of the opposed sides of the repeated unit;

welding the repeated unit, secured to the holding fixture, to an adjacent repeated unit; and removing the holding fixture from the repeated unit after the repeated unit has been welded to the adjacent repeated unit.

2. The method of claim 1 wherein the welding comprises linear friction welding.

3. The method of claim 1 further comprising:

after the holding fixture has been removed from the repeated unit, mating the at least one male member or female cavity of each of the plate members to at least one of another mating female cavity or another mating male member of each of opposed sides of an additional repeated unit;

welding the additional repeated unit, mated to the holding fixture, to at least one of the repeated unit or the adjacent repeated unit; and removing the holding fixture from the additional repeated unit after the additional repeated unit has been welded to at least one of the repeated unit or the adjacent repeated unit.

4. The method of claim 1 wherein the repeated units comprise isometric grid units.

5. The method of claim 1 wherein the two plate members are configured such that they are substantially similar in size to each of the repeated units in at least one plane.

6. The method of claim 1 wherein the securing comprises mating the male member of each of the plate members to the mating female cavity of each of the opposed sides of the repeated unit.

7. The method of claim 1 wherein the securing comprises mating the female cavity of each of the plate members to the mating male member of each of the opposed sides of the repeated unit.

8. The method of claim 1 wherein the method manufactures an aircraft part.

9. The method of claim 1 wherein the repeated units are at least one of formed, cast, or extruded.

10. The method of claim 1 wherein the repeated units are at least two different types.

11. The method of claim 1 further comprising, before the securing step, providing the two plate members which are not not connected relative to one another.

12. The method of claim 1 further comprising welding at least one of the repeated unit or the adjacent repeated unit to a base member while the holding fixture is secured to the at least one repeated unit or adjacent repeated unit.

13. The method of claim 1 further comprising securing the holding fixture to an additional repeated unit and welding the additional repeated unit in between and two each of the repeated unit and the adjacent repeated unit.

\* \* \* \* \*